UNITED STATES PATENT OFFICE.

GEORGE B. BURNHAM, OF BOROSOLVAY, CALIFORNIA.

PROCESS OF RECOVERING SODIUM CARBONATE SULPHATE FROM SALINE WATERS.

1,417,139.  Specification of Letters Patent.  Patented May 23, 1922.

No Drawing.  Application filed June 30, 1919. Serial No. 307,752.

*To all whom it may concern:*

Be it known that I, GEORGE B. BURNHAM, a citizen of the United States, and a resident of Borosolvay, San Bernardino County, State of California, have invented a new and useful Process of Recovering Sodium Carbonate Sulphate from Saline Waters, of which the following is a specification.

The invention relates to a process of recovering sodium carbonate sulphate from saline waters containing the same and particularly from the brines of the alkali lakes of the Western United States.

An object of the invention is to provide a process of recovering sodium carbonate sulphate from liquors containing sodium, carbonate and sulphate ions.

The invention will be set forth at length in the following description, where I shall outline in full, one form of the process of my invention. I shall describe the process as applied to the brine of Searles Lake in California, but it is to be understood that the process is not limited to this particular brine. The process may be also applied to solutions formed by dissolving sodium carbonate and sodium sulphate in water.

Searles Lake brine contains sodium and potassium, chloride, sulphate, carbonate and borate. By the process of my invention, I am able to employ natural temperatures for evaporation and cooling, and I prefer to make use of the temperature variations of winter and summer and day and night, but artificial variations in temperature and artificial evaporation may be employed when desired.

In the preferred form of my process, the lake brine, which is at a temperature of from 22° C to 25° C. the year round, is pumped, late in the fall of the year, into moderately shallow solar evaporation ponds, which I shall term the No. 1 ponds and in these ponds some of the sulphates are crystillized out by cooling of the brine due to the temperatures prevailing at that time. The brine remains in these shallow ponds during November and part of December, and the evaporation of the water during this time brings the concentration of the potash as high as is possible, consistent with the subsequent cooling that the brine will receive during the coldest part of winter.

During the cold nights of December and January, the brine is flowed from the No. 1 ponds into very shallow nightly cooling ponds (No. 2 ponds) which are about one inch deep, so that the brine will become thoroughly chilled. This extreme cooling causes carbonates, borates and more sulphates to crystallize out. In this way, by evaporating the brine slightly before extreme cooling, the potassium concentration in the brine will be as high as possible and the sulphate, carbonate and borate concentration will be as low as possible, consistent with the low nightly temperatures of winter.

In the coldest hours of the morning, the chilled brine is pumped from the shallow No. 2 ponds, into a deep pond (pond #3) in which the brine, on account of its depth, is not appreciably raised in temperature during the day. The agitation of the brine caused by pumping helps to crystallize out the sodium sulphates, carbonates and borates with which the brine is inclined to be supersaturated at the cold temperatures of the morning. The sodium sulphate and carbonate salts tend to crystallize out more rapidly than the borax and settle to the bottom of the deep pond #3 in a few hours. The brine is then pumped from deep pond #3 to another deep pond #4, to separate the deposited crsytals from the brine.

The crystals of sodium sulphate and sodium carbonate deposited in pond #3, are then redissolved in water. The solution thus formed is evaporated, preferably in solar ponds, whereupon crystals of sodium carbonate sulphate are formed. These crystals are then separated from the remaining liquor. The salt thus formed has the general formula of $Na_4(CO_3,SO_4)$ or $Na_4(CO_3,SO_4)nH_2O$.

A modified form of the process of obtaining sodium carbonate sulphate from Searles Lake brine consists in evaporating the brine during the summer. As evaporation occurs sodium chloride first crystallizes out and then, upon further evaporation, sodium chloride and sodium carbonate sulphate crystallize out together. The brine is then removed from the deposited crystals and the crystals of the two compounds separated by mechanical means. The sodium chloride crystals are much larger than the sodium carbonate sulphate crystals, so that they may be readily separated by screening, or otherwise.

I claim:

1. The process of producing sodium carbonate sulphate, which consists in mixing sodium carbonate and sodium sulphate in water to form a solution, evaporating the solution by summer solar heat whereby crystals of sodium carbonate sulphate are deposited, and separating the remaining liquor from the deposited crystals.

2. The process of recovering sodium carbonate sulphate from Searles Lake brine, which consists in partially concentrating and cooling the brine to crystallize out sodium carbonate and sodium sulphate, separating the remaining liquor from the crystals, redissolving the crystals and evaporating the solution thus formed by summer solar heat to crystallize out sodium carbonate sulphate.

3. The process of recovering sodium carbonate sulphate from Searles Lake brine, which consists in partially concentrating and cooling the brine to crystallize out sodium sulphate and sodium carbonate, removing the remaining liquor from the deposited crystals, redissolving the crystals in water, and evaporating the resultant solution to crystallize out sodium carbonate sulphate.

4. The process of producing sodium carbonate sulphate which consists in dissolving sodium carbonate and sodium sulphate in water, evaporating the solution at warm temperatures to crystallize out sodium carbonate sulphate and recovering the deposited crystals.

5. The process of producing sodium carbonate sulphate from Searles Lake brine, which consists in slowly evaporating the brine to produce saturation with sodium carbonate sulphate and continuing the slow evaporation to crystallize out sodium carbonate sulphate.

In testimony whereof, I have hereunto set my hand at San Francisco, California, this 9th day of June, 1919.

GEORGE B. BURNHAM.

In presence of—
H. G. PROST.